United States Patent [19]

Persson

[11] Patent Number: 4,795,232

[45] Date of Patent: Jan. 3, 1989

[54] FIBRE OPTIC CABLE RESPONSIVE TO MICROBENDING FORCES

[75] Inventor: Sven A. R. Persson, Hägersten, Sweden

[73] Assignee: Telefonaktiebolaget LM Ericsson, Stockholm, Sweden

[21] Appl. No.: 847,660

[22] PCT Filed: Jun. 27, 1985

[86] PCT No.: PCT/SE85/00265

§ 371 Date: Mar. 5, 1986

§ 102(e) Date: Mar. 5, 1986

[87] PCT Pub. No.: WO86/00988

PCT Pub. Date: Feb. 13, 1986

[30] Foreign Application Priority Data

Jul. 20, 1984 [SE] Sweden ............................ 8403811

[51] Int. Cl.$^4$ ............................................. G02B 6/44
[52] U.S. Cl. ................................. 350/96.23; 350/96.29
[58] Field of Search ................ 350/96.15, 96.23, 96.29

[56] References Cited

U.S. PATENT DOCUMENTS 3,750,058 7/1973 Bankert, Jr. et al. ........ 350/96.23 X
4,226,504 10/1980 Bellino .............................. 350/96.23
4,488,040 12/1984 Rowe .......................... 350/96.29 X Primary Examiner—John D. Lee
Assistant Examiner—Phan Heartney
Attorney, Agent, or Firm—Roberts, Spiecens & Cohen

[57] ABSTRACT

A fibre-optic cable responsive to microbending and forming part of a device for measuring pressure in accordance with the principle of creating a periodic mechanical disturbance in the fibre. The cable comprises a fibre (F) having a core (C) and a core-sheathing (M). An elongated element in the form of a twisted filament (T1, T2) or a twisted band (B) extends along the fibre, and a primary shield (H) encases the fibre and the twisted element such that the twisted element contacts the sheathing at periodically spaced separate regions.

12 Claims, 1 Drawing Sheet

FIBRE OPTIC CABLE RESPONSIVE TO MICROBENDING FORCES

FIELD OF THE INVENTION

The present invention relates to a fibre-optic cable responsive to microbending forces, for detecting pressure by mechanically influencing the fibre in the cable by means of a so-called periodic disturbance upon transmission of light through the fibre.

BACKGROUND

The aforesaid principle of detecting pressure by permitting the pressure to act upon an optic fibre made of glass or a plastics material, so that the transmitted light is periodically disturbed, is described in, for example, U.S. Pat. No. 4,163,397; SE-A-No. 410 521 and EP-A-No. 008 2820. According to EP-A-No. 008 2820 this periodic disturbance is created by winding a filament or wire helically around the optical fibre, whereafter an outer sheathing is placed around the filament and fibre structure. When light is transmitted through the fibre and the sheathing is simultaneously subjected to a pressure force, this pressure force will tend to flatten the wire helix. In this way there is created a series of periodic bends in the fibre, each of which corresponds to half the pitch of the helix. As a result thereof, the light passing through the fibre is attenuated, which can be indicated, for example, with the aid of a photoelectric sensor. Various fibre parameters affect the attenuation of the light. In the case of a fibre which exhibits a parabolic index profile, the periodic disturbance has a critical period length which produces maximum attenuation. This period length can be expressed as $$\wedge = 2\pi a/2D^{\frac{1}{2}}, \text{ where } 2D = \left[1 - \frac{n_o^2}{n_c^2}\right]$$

$\wedge$ = the periodic length of the disturbance $n_c$ = the refraction index in the center of the core $n_o$ = the refraction index in the sheathing $a$ = the radius of the fibre core.

SUMMARY OF THE INVENTION

One problem with the aforesaid known arrangement according to EP-A No. 008 2810 is that when the diameter of the filament is the same as that of the fibre ($d \approx 0.3$ mm), the filament, because it is wound helically around the fibre, will cause the dimensions of the cable to be unsuitably large. This is undesirable in the case of certain usages, for example when wishing to hide the cable incorporating the prepared fibre from view, or when the cable is to drawn through narrow passages. In addition, it is difficult to obtain an accurately defined disturbance periodicity in those cases when disturbance is determined by the pitch of the filament helix.

The object of the present invention is to provide a cable for determining pressure, in which the periodic disturbance can be obtained with simple elements which afford stability to the periodic disturbance when the cable is subjected to pressure.

The cable according to the invention has the characterizing features set forth in the claims.

BRIEF DESCRIPTION OF DRAWINGS

The invention will now be described in more detail with reference to the accompanying drawing.

DETAILED DESCRIPTION OF BEST MODES FOR CARRYING OUT THE INVENTION

Figure 1:
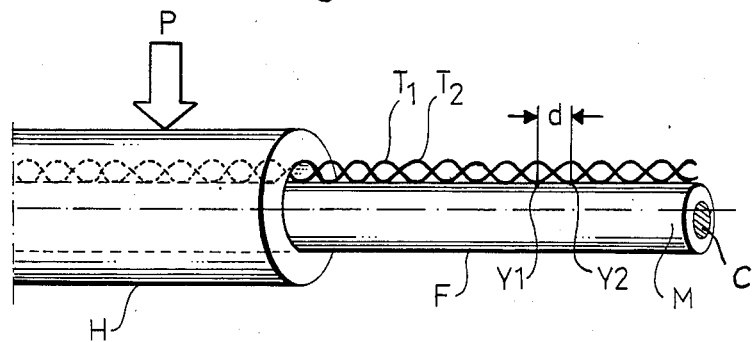
FIG. 1 illustrates a first embodiment of a fibre-optic cable according to the invention.

FIG. 1 is a sectional view of a cable according to the invention for detecting a pressure P applied to the casing H of the cable. The pressure P may be punctiform or distributed uniformly over the casing H. The optical fibre incorporated in the cable comprises a core C, a core-sheathing M and a surrounding casing H, the so-called primary shield, the refractive index of which is chosen to be slightly higher than the refractive index of the core-sheathing.

Located at one end of the fibre cable is a light source (not shown), while at its other end there is arranged a photosensor (not shown), light being transmitted through the fibre F with a given mode distribution. The light source and sensor may also be located at one and the same end of the fibre, and a reflector arranged at the other end thereof. An increase in the pressure P will result in greater attenuation of the modes, due to the fact that part of the power in each mode is coupled to other modes, inter alia radiation modes, which results in reduced transmitted power. This reduction can be indicated in a suitable manner, with the aid of the photosensor.

In order to achieve the aforesaid coupling between the modes, a mechanical disturbance is introduced into the fibre. In the case of a glass fibre, this disturbance can be introduced by permitting the pressure force P to act upon the primary shield H (FIG. 1), while in the case of a plastic fibre it is sufficient for the pressure force P to act directly on the core-sheathing M. The disturbance is intended to create periodic deformation of the fibre. This disturbance is created in the fibre incorporated in the cable according to FIG. 1 with the aid of an elongated deformed filament-element in the form of a double-filament structure comprising two twisted filaments T1 and T2. The filaments are twisted relatively firmly, so as not to be displaced axially in relation to one another to any appreciable extent when the pressure P is applied to the primary shield H. The double-filament structure T1, T2 has small isolated contact surfaces $Y_1$, $Y_2$ against the core-sheathing C, which are repeated at a given periodicity d. Accordingly, optimal damping of light through the fibre core is obtained with a fibre of given dimension, namely when $d = \wedge = 2\pi a/(2D)^{\frac{1}{2}}$. In this embodiment, the double-filament structure T1, T2 is placed straight along the fibre and parallel therewith.

Figure 2:
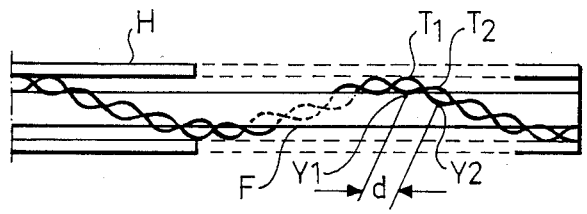
FIG. 2 illustrates a second embodiment.

In the embodiment of the cable illustrated in FIG. 2, the double-filament structure T1, T2 comprising said twisted filaments is wound helically around the fibre F. As with the FIG. 1 embodiment, there are obtained small contact surfaces $Y_1$, $Y_2$ with given periods d along the whole length of the filament structure. In this embodiment the pressure force P may be directed towards the surrounding core-sheathing M from various directions around the fibre, since the given deformation of the filament structure T1, T2 ensures that a pressure force is exerted against the core-sheathing M.

The dimension of the filament structure T1, T2, i.e. the spacing between the casing H and the fibre F should be of the same order as the cross-sectional dimension of the fibre. This enables the filament structure T1, T2 to be wound at a greater pitch around the fibre F, and the critical distance $d = \wedge$ will not be contingent on the pitch of the helix.

Figure 3:
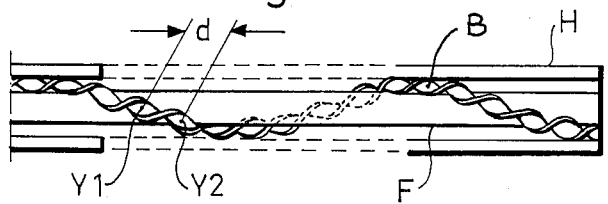
FIG. 3 illustrates a third embodiment of the cable according to the invention.

In the embodiment illustrated in FIG. 3 the longitudinal deforming element comprises a rigid or an elastic twisted band B, which is wound around the fibre. In this way isolated contact surfaces $Y_1$, $Y_2$ are formed at the locations at which the band abuts the core-sheathing M, these isolated surfaces producing the periodic disturbance ($d = \wedge$).

The cable construction according to the present invention distinguishes from the prior art constructions in that the elongated element extended longitudinally around the optical fibre is deformed initially, from the start, so that a periodic disturbance is able to occur upon contact of said element with the fibre. The advantage gained hereby resides in that greater freedeom is obtained in disposing the disturbance-creating element between the cable casing and the fibre, and therewith greater possibility of reducing the cross-sectional dimensions of the whole cable, when it is to be used as a pressure sensing device.

What is claimed is:

1. A fibre-optic cable responsive to microbending forces comprising at least one fibre which forms part of a pressure responsive device, in which a radiation source located at one end of the cable introduces light into the fibre and a sensor measures the intensity of the light transmitted through the fibre, a casing on said fibre, and at least one longitudinally extending element between the casing and the fibre for introducing a periodic disturbance along at least a part of the fibre in response to application of pressure to the cable, said periodic disturbance having a critical periodic length which corresponds to maximum attenuation of the light introduced in said fibre, said element extending longitudinally along the fibre in abutment therewith and being deformed so as to provide isolated contact regions along the surface of the fibre at a determined spacing substantially coinciding with said critical periodic length for the periodic disturbance.

2. A cable according to claim 1 wherein said element comprises two twisted filaments each contacting the fibre to form said contact regions.

3. A cable according to claim 1 wherein said element comprises a band which is twisted along its longitudinal extent and which forms said contact regions at the locations of its abutment with the surface of the fibre.

4. A cable according to claim 1 wherein said element extends parallel to the fibre.

5. A cable according to claim 1 wherein said element extends helically around the fibre.

6. A cable according to claim 2 wherein the two twisted filaments are helically twisted together and are secured so as not to be displaced axially relative to one another upon application of said pressure.

7. A cable according to claim 6 wherein said element extends parallel to the fibre.

8. A cable according to claim 6 wherein said element extends helically around the fibre.

9. A cable according to claim 1 wherein said fibre includes a core and sheathing on said core, said element being disposed between the sheathing and said casing.

10. A cable according to claim 1 wherein said element comprises a twisted member having a thickness which is substantially less than the diameter of the fibre.

11. A cable according to claim 10 wherein said twisted member is twisted about an axis located externally of the casing.

12. A cable according to claim 11 wherein said twisted member forms a transverse dimension around its axis of twist which is of the same order as the cross-sectional dimension of the fiber.

* * * * *